United States Patent [19]

Yavorsky

[11] Patent Number: 4,619,374
[45] Date of Patent: Oct. 28, 1986

[54] PRESSURE VESSEL WITH AN IMPROVED SIDEWALL STRUCTURE

[75] Inventor: William M. Yavorsky, Woodbury, Minn.

[73] Assignee: Ecodyne Corporation, Chicago, Ill.

[21] Appl. No.: 822,921

[22] Filed: Jan. 24, 1986

Related U.S. Application Data

[63] Continuation of Ser. No. 612,239, May 21, 1984, abandoned, and a continuation-in-part of Ser. No. 447,769, Jan. 24, 1983, abandoned.

[51] Int. Cl.⁴ ................. B65D 25/02; B65D 25/34; F16J 12/00
[52] U.S. Cl. ................. 220/414; 137/590; 220/3; 220/83; 220/465
[58] Field of Search ............ 220/3, 414, 459, 465, 220/453, 83; 285/211, 192, 196; 137/590

[56] References Cited

U.S. PATENT DOCUMENTS

| 868,548 | 10/1907 | Griffin | 220/3 X |
|---|---|---|---|
| 1,855,077 | 4/1932 | Wildt | 220/459 |
| 1,862,153 | 6/1932 | Lee | 285/196 X |
| 2,273,736 | 2/1942 | Raymond et al. | 220/3 X |
| 2,281,407 | 4/1942 | Bohnsack | 220/459 X |
| 2,402,781 | 6/1946 | Schreiber | 285/192 X |
| 3,587,904 | 6/1971 | Harris et al. | 220/3 |
| 3,653,846 | 4/1972 | Kubec et al. | 220/3 X |
| 3,662,780 | 5/1972 | Marsh | 220/3 X |
| 3,874,544 | 4/1975 | Harmon | 220/3 |
| 3,907,149 | 9/1975 | Harmon | 220/3 |
| 4,191,304 | 3/1980 | Schiedat | 220/3 X |

FOREIGN PATENT DOCUMENTS 2639283  3/1978  Fed. Rep. of Germany .......... 220/3

Primary Examiner—Allan N. Shoap
Attorney, Agent, or Firm—Neuman, Williams, Anderson & Olson

[57] ABSTRACT

A pressure vessel capable of containing fluids at high pressures and temperatures is provided. The vessel comprises a shell having an inner lining, a plug bound to the inner lining and an outer lining disposed around and bound to the plug and the inner lining. The inner lining serves as an impervious barrier for the fluids. The plug, disposed between the inner and outer linings increases the thickness of the shell in a localized area of the shell so that a port through this area can support a fitting or other devices without leakage. The outer lining covers the inner lining and the plug and provides structural rigidity, strength, and integrity for the shell.

4 Claims, 3 Drawing Figures

PRESSURE VESSEL WITH AN IMPROVED SIDEWALL STRUCTURE

This application is a continuation of application Ser. No. 612,239 filed May 21, 1984, now abandoned, and this application is a continuation-in-part of application Ser. No. 447,769, filed Jan. 24, 1983, for a "Plastic Shell Construction for a Pressure Tank and Method for Manufacturing Same."

BACKGROUND OF THE INVENTION

1. Field of the Invention

The present invention relates to a pressure vessel, and more particularly to a pressure vessel for water treatment equipment. This vessel has thin sidewalls made from a thermoplastic material which are wrapped with a filament type material for added strength and integrity. The entire vessel is then wrapped in layers of insulating foam and sheet material. The thin sidewalls of the pressure vessel have one or more receiving pockets and a structural insert means bonded or otherwise adhered into each of the receiving pockets. The receiving pockets with the structural insert means form localized areas of increased thickness in the thin sidewalls of the vessel. A port or aperture is formed in the localized areas of increased thickness for receiving spouts or other fittings.

2. Description of the Prior Art

Modern material handling applications require that a pressure vessel safely contain various corrosive and non-corrosive fluids at high pressures and temperature. The prior art pressure vessels capable of withstanding these high working pressures and temperatures unusually have massive, commonly metal, wall structures that limit the vessel's use to commercial or heavy duty industrial applications. Since these vessels have thick and heavy sidewall structures they can easily accommodate side ports that adequately support various fittings without leakage. However, as indicated above, the use of these heavy metal vessels is restricted and frequently their manufacture is difficult and expensive.

The prior art also includes pressure vessels designed to overcome the disadvantages of these massive metal vessels. One such pressure vessel is the vessel disclosed in U.S. Pat. No. 3,874,544 to Harmon. This vessel has a composite outer shell of continuously wound glass filaments impregnated with a thermosetting resinous material and an inner liner made of blow molded plastic. Its sidewalls are relatively thin and light, making it easy to handle and construct. However, this vessel only includes top and bottom ports with fittings; it does not include any ports in its sidewalls. Attempting to place a fitting in a port in the thin sidewall of such a vessel presents significant and serious problems. First, the thin sidewall does not have sufficient material thickness to be properly threaded and accordingly cannot directly received a threaded fitting. Second, the thin sidewall is not thick enough to adequately support a pipe or the like which could then receive a threaded fitting. In general, the aperture or port in such a thin sidewall has an annular wall surface. The outer surface of the pipe or fitting must be bonded or sealed to this annular wall surface in order to prevent leaks from within the vessel. Since the contact area between the annular wall surface and the insert is small, a good seal is not possible. Also, since the contact area is small, the structural integrity of the seal is weak and easily broken or cracked by even slight contact with the external portion of the fitting. Finally, the thin sidewall of the vessel is weakened in the area of the port and may fracture or fail in this area.

Some prior art vessels have complicated component arrangements around the ports in their sidewalls. For example, U.S. Pat. No. 868,548 to Griffin discloses a compressed air tank with a pipe that extends into the tank through a plate which is bolted to the side of the tank's outer shell; a cone is bolted to the plate; and a rubber bag is disposed inside the tank. A cap-shaped nut is screwed to the lower end of the pipe, and the cone is clamped to a thickened portion of the rubber bag to secure it. This structure is a mechanically connected arrangement of parts and not a portion of a one-piece, integral unit. Neither the cone nor the nut binds with or fuses into the thickened portion of the rubber bag. The arrangement only serves to clamp and secure the rubber bag, not to increase the thickness of the metal shell or to support the pipe.

U.S. Pat. No. 2,273,736 to Raymond et al. discloses a pressure vessel with a fitting at a port in its sidewall. The fitting is a rounded metal piece with a flat top and countersunk base. Since the pressure vessel has thick and massive sidewalls, the fitting does not serve to increase the thickness of these sidewalls. The fitting's only function is to provide a passageway through the layers of metal ribbon that form a portion of the sidewall of the vessel. The top of the fitting projects beyond the outer surface of the vessel, providing a discontinuity in this surface that limits the vessel's application.

The pressure vessel of the present invention avoids the problems of the prior art pressure vessels. The pressure vessel of the present invention is light weight, easy to manufacture, provides for fittings in the sidewall and is adaptable for residential use. It has a thin thermoplastic liner with at least one receiving pocket in the sidewall. An insert or plug means is adhered or bonded into each of the receiving pockets so that its surface is flush with the surface of the liner. A reinforcing dome means is placed at both ends of the liner to provide added strength over these surfaces. A filament winding is wrapped around the liner, over the insert means and over at least a portion of the dome means. Layers of foam, sheet or other insulating material can be placed over the filament winding to provide temperature control for the fluid contained within the vessel if that function is necessary. Since the thin sidewalls of the pressure vessel have localized areas of increased thickness which are integral with the inner liner, apertures or ports can be opened through these areas and appropriate fittings placed in the ports do not weaken the thin sidewalls and do not create leaks of fluids stored within the vessel. These localized areas protrude toward the inside of the inner liner, maintaining a contiguous smooth surface over the length of the sidewall.

OBJECTS OF THE INVENTION

It is a general object of this invention to provide an improved thin-walled pressure vessel with localized areas of increased thickness having a port or aperture therein adapted to receive a fitting.

It is another object of this invention to provide a thin-walled pressure vessel which is capable of having sidewall fittings and which is capable of containing fluids at high pressures and temperatures, yet one that is light weight, structurally strong, and leak-proof.

It is another object of this invention to provide a thin-walled pressure vessel having a reinforced dome end structure and sidewalls with localized areas of increased thickness to accommodate ports therein that receive various fittings and to support these fittings without leakage through the port.

It is yet another object of this invention to provide a thin-walled pressure vessel with a thermoplastic liner wrapped by a filament winding and having sidewalls with localized areas of increased thickness that are an integral part of the sidewall and that do not disrupt the continuity of the outer surface of the vessel.

Other objects, advantages, and features of the present invention will become apparent upon reading the following detailed description and appended claims and upon reference to the accompanying drawings.

SUMMARY OF THE INVENTION

In accordance with the preferred embodiment of the invention, the applicant provides an improved thin-walled pressure vessel for containing fluids at high pressures and temperatures. This vessel has thin sidewalls with localized areas of increased thickness adapted for a port or aperture which receives a fitting. The vessel has an elongated cylindrical form with thin sidewalls and hemispherical or domed ends. It includes an inner lining made of corrosion resistant thermoplastic material which serves as an impervious barrier to contain the fluid placed in the vessel. The tube portion of the inner lining has at least one recess or pocket which extends into the internal volume of the tube. The depth of this recess is substantially greater than the thickness of the sidewalls forming the tube. A plug or insert made of a thermoplastic material similar to the material of the inner lining fits into and completely fills each recess or pocket formed in the tube sidewall. The insert or plug is bound to the inner lining in the recess or pocket and forms an integral portion of the liner. The inner lining also comprises two substantially hemispherical end portions connected to the tube portion to form a contiguous one piece inner lining. Two thin hemispherical reinforcing caps or domes made of a thermoplastic material or metal cover the end portions of the inner lining and provide added strength to the end portions of the lining. An outer lining or sleeve is made of resin impregnated glass filaments or a similar material. The outer lining covers the tube portion of the inner lining including the plug and a portion of each of the two reinforcing domes, securing them to the inner lining. This outer lining adds structural rigidity, strength, and integrity to the vessel.

The pressure vessel has thin sidewalls with localized areas of increased thickness corresponding to the inserts or plugs. A port or aperture placed through these localized areas of increased thickness has sufficient aperture wall area to support a fitting and provide a leak proof seal. In addition, these areas of increased thickness provide improved structural support for the vessel at the point which would otherwise be weakened due to the port or aperture. Since the inserts are recessed within the pocket formed in the inner liner and bonded to the liner and since the outer filament winding or sleeve covers both the inner liner and the insert, the outer surface of the vessel is contiguous and smooth.

To construct this vessel, the maker first extrudes the tube portion of the inner lining from a suitable thermoplastic material. The maker then molds the two hemispherical ends of inner lining using a thermoplastic material and a blow molding process, fusing each end into opposite ends of the tube portion. The next step is to bind the plug or insert to the inner lining in the recess or pocket using a suitable adhesive or other means. The maker then caps the two ends of the inner lining with the two reinforcing domes and forms the sleeve or outer lining around the tube portion of the inner lining including the plug and over a portion of the two reinforcing domes, securing the reinforcing domes to the inner lining. Appropriate foam and sheet insulation can then be applied over the filament winding if desired to provide additional temperature control of the contained fluid. Finally, the maker bores a port through the completed shell in the area of the plug and may open other ports through the reinforcing caps and the inner liner at the two ends of the shell. Appropriate fittings are placed in the ports to permit the ingress and egress of the contained fluid and the placement of instruments such as pressure valves and heating elements into the vessel.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the applicant will describe the invention in connection with a preferred embodiment, one will understand that the invention is not limited to this embodiment. Furthermore, one should understand that the drawings are not necessarily to scale.

DETAILED DESCRIPTION OF THE DRAWINGS AND THE PREFERRED EMBODIMENT

Figure 1:
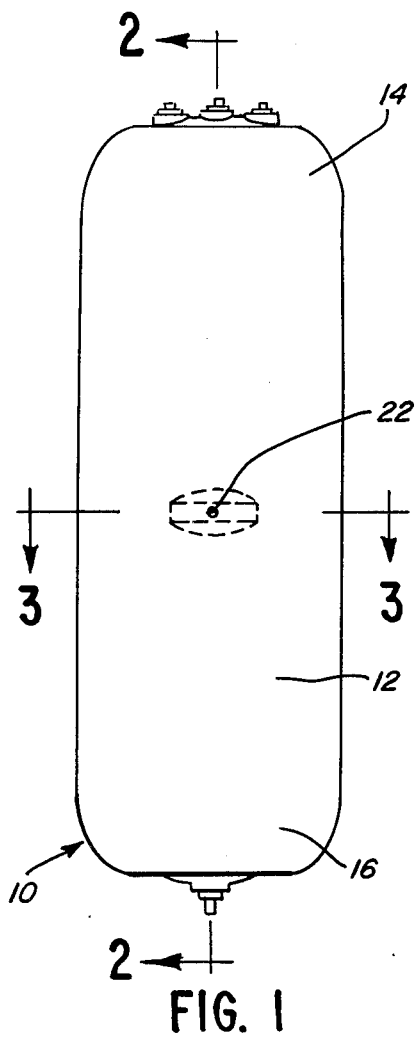
FIG. 1 is a perspective view of the preferred embodiment of the pressure vessel of the present invention.

Turning now to the drawings, FIG. 1 shows the preferred embodiment of a pressure vessel according to the present invention generally at 10. The vessel 10 is a cylindrical tank capable of containing various fluids at high pressures and temperatures. It comprises a hollow shell having an elongate cylindrical body 12 forming the sidewalls and a substantially hemispherically shaped top portion 14 and a similarly shaped bottom portion 16. In the preferred embodiment, the vessel 10 has three top ports or openings 18a, 18b and 18c (See FIG. 2) at the apex of the top hemispherical end 14, a bottom port 20 (See FIG. 2) at the apex of the bottom hemispherical end 16, and at least one side port 22 at approximately the middle of the sidewall 12. The top ports 18a, b and c each support a fitting 19a, b and c. The bottom port 20 also supports a fitting 21. Finally, the side port 22 supports a fitting 23. One of the top ports provides an inlet through which the fluid that the vessel contains enters the vessel, the other an outlet for fluid from the vessel, and the third a vent or pressure release path for escaping gas. The bottom port 20 functions as a drain. Although the port 22 may serve any of the above functions, it is particularly intended to provide a passageway through which temperature and pressure gauges, heating elements, or similar instruments are inserted within the vessel to communicate with the fluid inside the vessel.

It should be obvious to one of ordinary skill in the art that the number of ports in either top, side or bottom of the vessel can be varied to accommodate different needs. Similarly, in the preferred embodiment the side port is positioned at approximately the midpoint of the sidewall of the vessel. It should also be obvious to one of ordinary skill in the art that the side ports can be placed at any location in the sidewall of the vessel.

In the preferred embodiment the pressure vessel is designed for use as a hot water heater, in which case cold water would enter the vessel via fitting 19a and port 18a, heated water would exit the vessel via fitting 19b and port 18b and a pressure release valve (not shown) would be inserted in fitting 19c and port 18c to be used as a safeguard to prevent accidents. The bottom port 20 and fitting 21 is used as a drain and a standard commercially available heating element (not shown) is inserted within the vessel via side port 22 and fitting 23.

Figure 2:
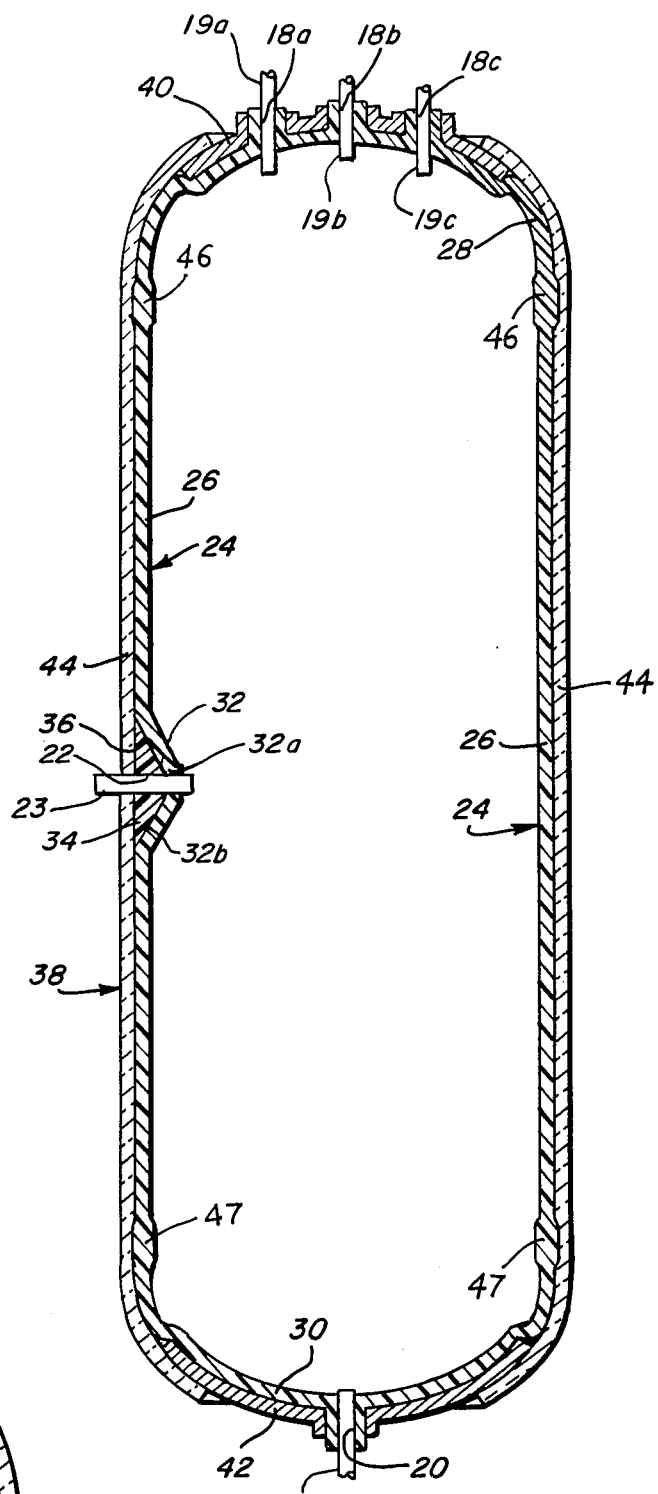
FIG. 2 is a sectional view taken along line 2—2 of FIG. 1 and through a side port of the pressure vessel.
Figure 3:
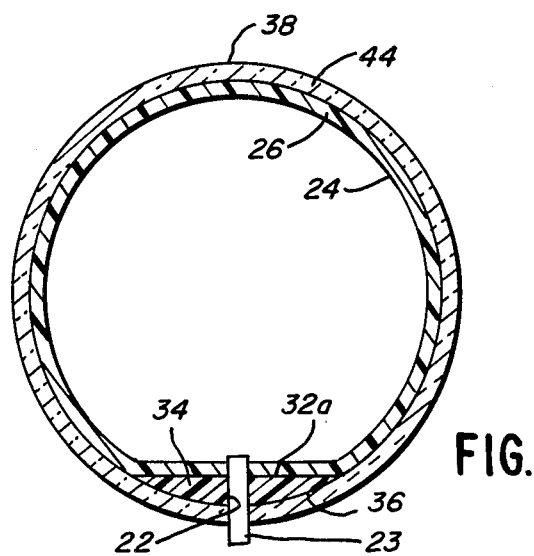
FIG. 3 is a sectional view taken along line 3—3 of FIG. 1 and through the side port shown in FIG. 2.

Referring to FIGS. 2 and 3, the shell of the vessel 10 includes an inner liner 24 made of a suitable thermoplastic material such as polybutadiene. The liner 24 may also be any other high-strength, impervious material that resists high temperatures and the corrosion of various chemicals. The liner 24 is the inside layer of the vessel 10, and it has the same general shape as the outside surface of the shell as described above. The liner 24 is an integral unit. It includes a thin, elongate tube portion 26 and two generally hemispherical ends 28 and 30. The liner 24 protrudes inward in at least one location to form a pocket or recess 32. This recess 32 has a flat bottom 32a with sloping sides 32b. Its depth is substantially greater than the thickness of the tube portion 26 of the liner 24. It should be obvious to one of ordinary skill in the art that the general shape of the pocket or recess 32 can be modified to substantially any geometric form.

The vessel 10 also includes a plug or insert 34 made from a material such as the material used to make the liner 24. The insert 34 is sized and shaped to fit into and fill the recess 32. The top 36 of the plug 34 is flush with the top, of the recess 32 or with the circular outer surface of the tube portion 26 of the liner 24. The plug 34 is bonded or otherwise adhered to the liner 24 to form an integral unit and serves to increase the thickness of the sidewall 12 in a specific localized area.

The third component of the vessel 10 is an outer lining 38 which covers the inner lining 24 including the plug 34 and which provides strength, rigidity, and structural integrity to the vessel 10. The outer lining 38 includes two generally hemispherical caps, 40 and 42, that cover the two domed ends 28 and 30, respectively, of the inner lining 24. The outer lining 38 also includes a sleeve 44 disposed around the tube portion 26 of the inner lining 24, including the plug 34, and over a portion of the caps 40 and 42. The sleeve 44 is a layer of glass filaments bound by a resinous material to each other and to the lining 24, the plug 34 and the bottom ends of caps 40 and 42. The sleeve 44 secures the caps 40 and 42 to the lining 24. It should be obvious to one of ordinary skill in the art that the caps 40 and 42 as well as the sleeve 44 can be made from various materials.

The port or aperture 22 opens into the vessel 10 through the fiberglass sleeve 44, the plug 34 and the tube portion 26 of the inner lining 24. The fitting 23 extends through the port 22 into the vessel 10. The localized area of increased thickness around the port 22 supports the fitting 23. It also serves to increase the length of impervious material through which the port 22 extends, eliminating any leakage of the fluid contained in vessel 10. The ports 18a, 18b, and 18c and their respective fittings 19a, 19b and 19c extend through the metal cap 40 and the dome end 28 of the inner lining 24 and the port 20 and fitting 21 extend through the cap 42 and the domed end 30. In addition to the structure described above, layers of insulating material (not shown) can be added to this basic structure for insulative, cosmetic or other purposes. Also the entire vessel 10, with or without additional insulation, can be mounted on a stand (not shown).

To construct the vessel 10, the maker of the vessel first forms the thermoplastic inner lining 24 by extruding the tube portion 26 of the lining and by blow molding the domed ends 28 and 30 and fusing them to the tube portion 26. The fittings 19a, 19b, 19c and 21 are inserted into the domed ends 28 and 30 during the blow molding process to form ports 18a, 18b, 18c and 20 in the inner lining 24. If desired, these ports can be formed at a latter time and the fitting inserted then. Where the domed ends 28 and 30 fuse into the tube portion 26, two annular bulges, 46 and 47, are formed.

The maker then inserts the plug 34 into the recess 32 and binds it to the inner lining 24 using a suitable adhesive. Any other suitable technique for adhering the plug 34 to the inner liner 24 can be used. The plug 34 may have the fitting 23 pre-inserted in which case an appropriate aperture must be made in liner 24 before the plug 34 is adhered into the pocket. The next step is to mechanically attach the caps 40 and 42 to the inner lining 24. Then, using the inner lining 24 with the plug 34 and the caps 40 and 42 secured to it as a mandrel, the maker winds the glass filaments around the tube portion 26 of the inner lining 24 and over the bottom ends of caps 40 and 42 to form the sleeve 40. Finally, the maker opens port 22 by boring through the sleeve 44, the plug 34 and the inner lining 24 at the center of the plug 34 and ports 18a, 18b, 18c and 20 by boring through the respective metal caps of the outer lining 38 and the domed ends of the inner lining 24. The domed ends of the inner lining 24 and the caps 40 and 42 may have pre-formed openings. In this event, the maker when mechanically attaching the caps to the inner liner 24, must align the openings in the caps with the openings in the inner liner to form ports 18a, 18b, 18c and 20.

Thus, the applicant has provided a pressure vessel capable of containing fluids at high pressures and temperatures. The vessel is simple, inexpensive and reusable. It comprises a thin, impervious and light shell with at least one localized area of increased thickness through which a side port extends. This buttressed area is an integral part of the shell, and it provides support for any fitting or other similar device placed in the port. The buttressed area protrudes into the inside of the vessel and does not disrupt the continuity of the outer surface of the vessel. Placing the port through this area increases the length of the port or increases the surface area of contact between the wall of the aperture or port and the fitting, thus minimizing leakage by increasing the leakage path and the likelihood of having a contiguous seal.

While the applicant has shown only one embodiment of the invention, one will understand, of course, that the invention is not limited to this embodiment since those skilled in the art to which the invention pertains may make modifications and other embodiments of the principles of this invention, particularly upon considering the foregoing teachings. For example, instead of placing plugs into recesses formed in the inner lining to locally increase the thickness of the lining, one skilled in the art may mold the inner lining with localized areas of increased thickness included. The present invention discloses a pressure vessel capable of containing fluids at high pressures and temperatures. It is a thin-walled structure with localized areas of increased thickness for side ports. These areas do not disrupt the continuity of the outside surface of the structure, but they provide support for fitting and other devices disposed in the ports that extend through them. They also increase the length of the ports and increase the surface area of contact between the wall of the port or aperture and the fitting, to minimize leakage. The applicant, therefore, by the appended claims, intends to cover any such modifications and other embodiments as incorporate those features which constitute the essential features of this invention.

What is claimed is:

1. A pressure vessel for containing fluids, said pressure vessel comprising a thin thermoplastic inner liner forming a container which is impervious to said fluids, said container having a substantially cylindrical middle portion, a substantially hemispherical first end portion and a substantially hemispherical second end portion, said end portions being connected with said cylindrical middle portion, a segment of said cylindrical middle portion of said thin inner liner disposed inward to define at least one recess in said container, the wall of said recess being substantially the same thickness as said cylindrical middle portion of said thin inner liner, said recess having a depth which extends from the outer surface of said container to the bottom of said recess and which is substantially greater than the wall thickness of said cylindrical middle portion of said thin inner liner; an insert means positioned within and substantially filling said recess and adhered to the walls of said recess for forming a thickened section, said thickened section being an integral part of said thin inner liner and having a maximum thickness substantially greater than the wall thickness of said cylindrical middle portion of said thin inner liner, the outer surface of said thickened section being substantially contiguous with the outer surface of said cylindrical middle portion and forming a substantially smooth curved surface with said cylindrical middle portion; a thin outer filament wound liner bound to and covering a substantial portion of said inner liner and covering said insert means, for providing added strength and forming a rigid, integral vessel with said inner liner and insert means; and a port extending through a segment of said outer liner and said insert means and said segment of said inner liner for providing access to the interior of said vessel; said segment of said outer liner, said insert means and said segment of said inner liner forming a localized area of increased wall thickness for said vessel sufficient to support a fitting and form a leakproof seal along said port.

2. A pressure vessel as in claim 1, wherein said outer liner comprises a filament wound sleeve segment and first and second substantially hemispherical caps, said caps are positioned to substantially cover said first and second end portions of said inner liner and said sleeve segment is positioned to cover said inner liner, said insert means and a portion of said caps.

3. A pressure vessel for containing fluids, said pressure vessel comprising: a thin inner liner with a substantially cylindrical middle portion and first and second substantially hemispherical ends, said first end having at least one top opening and said second end having at least one bottom opening, a segment of said cylindrical middle portion of said thin inner liner is disposed inward to define at least one recess in said inner liner, said recess having a depth which extends from the outer surface of said inner liner to the bottom of said recess and which is substantially greater than the wall thickness of said cylindrical middle portion of said inner liner and having walls substantially the same thickness as said cylindrical middle portion of said thin inner liner, and a side opening through a portion of said recess; an insert means positioned within and substanitally filling said recess and adhered to said walls of said recess for forming a thickened section, said thickened secion being an integral part of said thin inner liner and having a maximum thickness substantially greater than the thickness of said cylindrical middle portion of said thin inner liner, said insert means having an opening which is coincident with said side opening, said insert means having an outer surface substantially contiguous with the outer surface of said cylindrical middle portion and forming a substantially smooth curved surface with said cylindrical middle portion; a thin outer liner bound to and covering said inner liner and covering said insert means, to form a rigid, integral vessel with said inner liner and insert means, said outer liner having an opening through a segment which is coincident with said opening of said insert means; said side opening, said opening of said inert means, and said opening of said outer liner forming a port for providing access to the interior of said vessel; said segment of said outer liner, said insert means and said segment of said inner liner forming a localized area of increased wall thickness for said vessel sufficient to support a fitting and form a leakproof seal along said port.

4. A pressure vessel as in claim 3 further comprising a fitting positioned through said port, the sidewall area of said port and said fitting forming a leak proof seal of said port.

* * * * *